United States Patent [19]

Konick

[11] 4,150,882

[45] Apr. 24, 1979

[54] IDENTIFICATION CODE GENERATOR FOR HIGH SPEED MOTION PICTURE PHOTOGRAPHY

[75] Inventor: William L. Konick, 1111 University Blvd. W., Silver Spring, Md. 20902

[73] Assignee: The United States of America as represented by the Secretary of the Army, Washington, D.C.

[21] Appl. No.: 736,979

[22] Filed: Oct. 29, 1976

[51] Int. Cl.² ............................................. G03B 17/24
[52] U.S. Cl. ................................. 352/39; 352/84; 352/92; 352/236; 354/105; 354/109; 346/107 R
[58] Field of Search .................. 352/38, 39, 84, 236, 352/92; 354/105, 109; 346/107 R, 107 A, 107 B, 107 C, 107 SC, 107 UP

[56] References Cited

U.S. PATENT DOCUMENTS

| 2,496,392 | 2/1950 | Hasbrook | 346/107 SC |
|---|---|---|---|
| 3,603,974 | 9/1971 | Copeland, Jr. | 352/84 |
| 3,742,833 | 7/1973 | Sewell et al. | 346/107 R |
| 3,858,967 | 1/1975 | O'Donnell | 352/39 |

*Primary Examiner*—Russell E. Adams
*Attorney, Agent, or Firm*—Nathan Edelberg; Robert P. Gibson; Saul Elbaum

[57] ABSTRACT

A method and apparatus for generating a variable pulse width code of at least three binary coded decimal digits at a rate sufficiently greater than the film speed of a movie camera to cause a single light source in the camera to record in a continuous sequence all the bits of the three digits on the edge of a film in the camera adjacent each frame.

10 Claims, 4 Drawing Figures

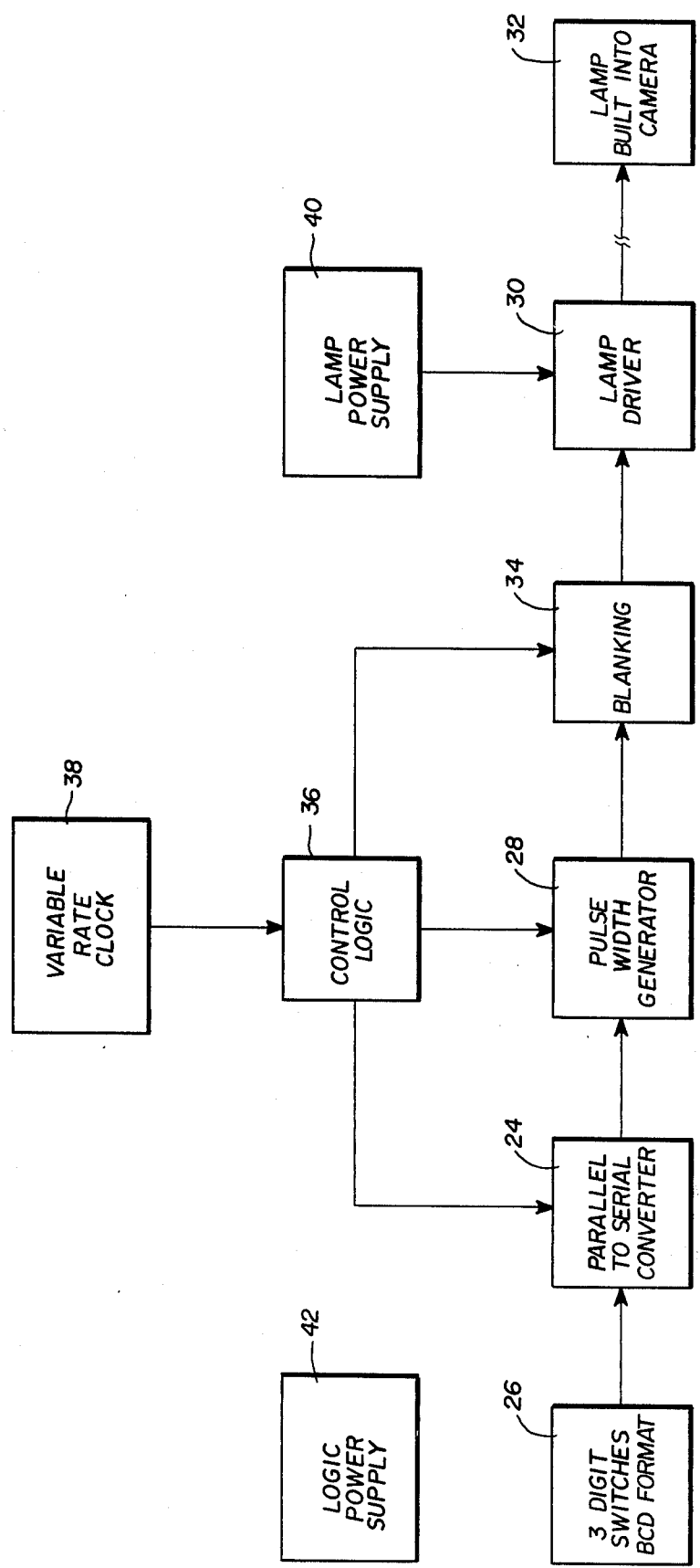

IDENTIFICATION CODE GENERATOR FOR HIGH SPEED MOTION PICTURE PHOTOGRAPHY

RIGHTS OF THE GOVERNMENT

The invention described herein may be manufactured, used, and licensed by or for the U.S. Government for governmental purposes without the payment to me of any royalty thereon.

BACKGROUND OF THE INVENTION

1. Field of the Invention

The present invention relates generally to marking movie film with information, more specifically to a unique method and apparatus for supplying a code to the movie film at the edge of each frame.

2. Description of the Prior Art

In the field of high-speed motion picture photography of ordnance rounds, it is desirable to have an identification code for each frame. An identification system previously used was a square panel with 16 lamps on it representing four binary coded decimals (BCD) digits. The panel has the disadvantage of having to be placed directly in the impact area so that it would be in the photographic field of view when used at a field test in which the camera's telescopic lenses were positioned in a tower overlooking the impact area. Prior art devices were developed to move the identification code or number generating system from the impact area to the camera position using an IRIG serial timing code generator to drive one of the two timing lamps already built into the camera by the manufacturer. The data rate of the IRIG code was not compatible with the camera film rate. Consequently, systems of the prior art would generally record the sequential bits and digits of the code over a plurality of frame edges. Other prior art devices, as illustrated in FIG. 2, would use four parallel markings to represent the four bits of a single BCD digit which, as in the previously discussed art devices, extends over a plurality of frames for each digit.

Other systems of information coding have tried to duplicate the concept of the original light panels wherein the digits are in sequence, but the four bits of the element are in parallel. This is illustrated in FIG. 1 wherein six digits of binary coded decimals are recorded for a specific frame. The systems of the prior art have recorded the digits by sequential exposures or have recorded the total digits by a single exposure at the edge of the film at the film gate, thus requiring synchronization with the shutter.

By use of long codes extended over many frames of the film, the identification or time code cannot be read while the original film frame is being interpreted. The film generally must be removed from he film projector and placed on a special device in order to read the code. Code readers of the prior device are generally optical readers or light tables. It is also extremely difficult to tell what portions of the code sequence you are in when the code extends over several feet of film. Thus, there exists a need for a coded sequence which will be recorded on the edge of a single frame and which is easily and quickly discernible to read.

SUMMARY OF THE INVENTION

The present invention is a method and apparatus for generating a variable pulse width code of at least three binary coded decimal digits at a rate sufficiently greater than the film speed of a movie camera to cause a single light source in the camera to record in a continuous sequence all the bits of the three digits on the edge of the film in the camer adjacent to each frame. The complete identification code sequence is repeated 1½ to 2 times per frame in the margin of the film. The code sequence is separated by a long space so that the beginning and end is easily discernible. The apparatus to produce such a code includes an imput device which converts the input information, which is generally three digits of BCD, from a parallel to a serial code. The serial code drives a pulse width generator which is used to drive an output circuit which amplifies the signal to drive the lamp built into the camera. Control logic, having a variable rate clock adjusted to provide a signal proportional to the speed of the film, controls the input circuit, pulse width generator and output circuits at a rate sufficiently greater than the speed of the film to record the total identification code sequence on a single frame of film in a serial sequence. A blanking circuit is included between the pulse width generator and the output circuit so as to provide a discernible space between the sequences of the repeated code. The power supply for the output circuit or lamp amplifier or driver may be separate from the power supply of the remaining elements of the code generator.

OBJECTS OF THE INVENTION

An object of the present invention is to supply a novel code and identification code generator for use in high speed motion picture films.

Another object is to provide a code generator which is capable of recording a total sequence adjacent a single frame of a motion picture.

A further object of the invention is to provide an adjustable recording rate so as to accommodate cameras in a large range of film speeds.

Still another object is to provide an inexpensive identification code generator for recording at least three digits of binary coded decimals in a serial sequence adjacent a single frame of motion picture film.

Still a further object of the invention is to provide a code, method, and apparatus for producing an indentification code on a single frame of film so as to be easily interpreted without removing the film from the projector.

An even further object is to provide indentification code format whose beginning and end is easily discernible and whose interpretation is not varied by the variations and functions or operation of the motion picture camera.

Other objects, advantages, and novel features of the present invention will become apparent from the following detailed description of the invention when considered in conjunction with the accompanying drawings.

BRIEF DESCRIPTION OF THE DRAWINGS

FIG. 4 is a block diagram of a pulse code generator in accordance with the principles of the present invention.

DESCRIPTION OF THE PREFERRED EMBODIMENTS

Figure 1:
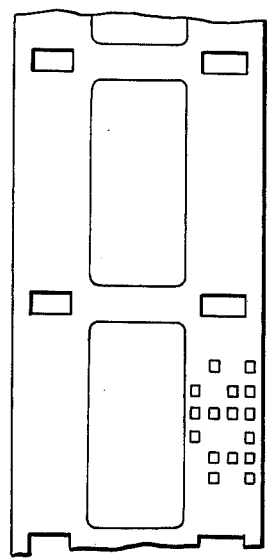
FIGS. 1 and 2 illustrate a portion of film having code formats of the prior art.
Figure 2:
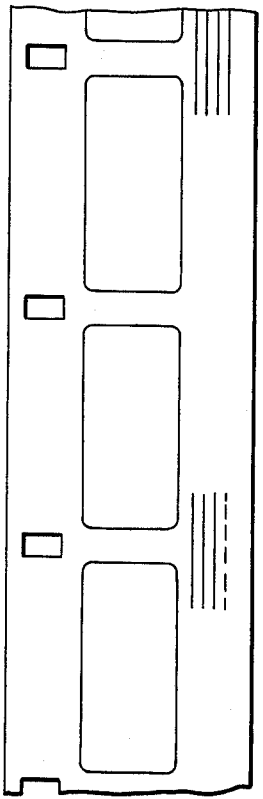
Figure 3:
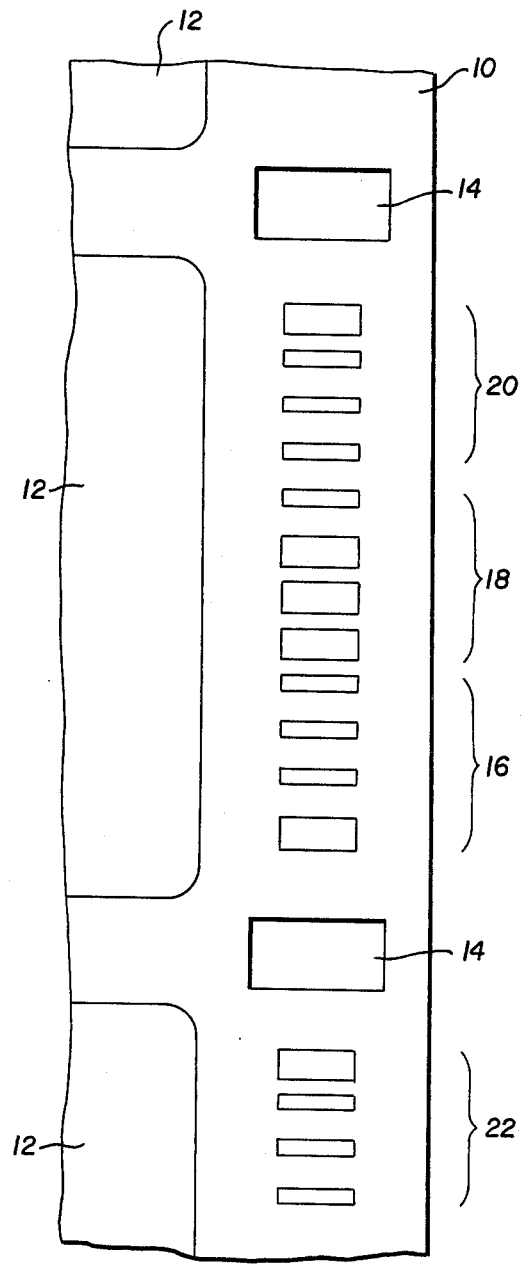
FIG. 3 illustrates a portion of film having an identification code embodying the principles of the present invention.

FIG. 3, which illustrates the code of the present invention, shows a strip of film 10 having a plurality of frames 12 thereon and a plurality of sprocket holes 14. In between a pair of sprocket holes 14 is shown recorded a plurality of long and short width bars which represent one total sequence of an identificaion code of three binary coded decimals 16, 18 and 20. Each of the digits of the binary coded decimals include four bits of information. Therefor, a total identificaton code sequence would include a serial sequence of 12 bits of information. By selecting the wider bar to represent a logic one and the narrow bar to represent a logic zero, the first digit 16 represents a one having the bits 0 0 0 1, the second digit 18 represents a seven, having the bits 0 1 1 1, and the third digit 20 represents an eight, having the bits 1 0 0 0. A long blank is illustrated between the binary coded decimal digit 22 and the first digit 16 of the code so as to quickly and easily discern the beginning and end of a complete sequence of code. Although the space is illustrated as extending over a sprocket hole, the code generator could be driven at a sufficient speed such that the total sequence of three BCD digits are recorded twice between the sprocket holes. Thus, the space would not extend over a sprocket hole necessarily and would be discernible between the double sequence between the two sprocket holes 14.

By recording the complete identification code sequence per frame, a technician using a stop action film projector can read the total code sequence for a given frame by stopping the film and looking at the projection without removing the film from the projector. This of course assumes the use of a standard 16 milimeter projector that has an extended aperture in the film gate plate so that the left and right margins of the film, including the sprocket holes, can be projected. Also, by recording the complete sequence of the identification code in a single frame, the beginning of a sequence is easy to find and variations of film rate during one frame have very little effect on the recorded code.

The present code is recorded by using a light source which is a timing light already available in high speed motion picture film cameras. The timing light in the camera generally precedes the shutter in the film path and consequently the synchronization of the recording system with the shutters is not required. Since the date is asynchronous with the shutter, many cameras can then be connected to the same electronic or data stream. The sole requirement is that the frame rate of each camera on the data stream should be approximately the same so that a complete sequence of code bars can be recorded in the margin of a single frame of the film in each camera. The need of synchronizaton, which unduly increases the expense of a system, is not needed for the present purposes.

The apparatus capable of producting the present code is illustrated in FIG. 4. The imput portion of the circuit includes a parallel to serial converter 24 which receives three manually inserted binary coded decimal digits from switch element 26. The converted 12 bit serial BCD code is used to drive a pulse width generator 28. The varying width pulses from pulse width generator 28 are used to drive a lamp driver 30 which amplifies the pulses sufficiently to drive a lamp 32 built into a camera. A blanking circuit 34 interconnects the output of the pulse width generator 28 and the lamp driver 30 so as to produce the space with no pulses between the set of three BCD digits or twelve data bits so that the beginning of the code sequence is easily discernible. Lamp driver 30 amplifies the lower power CMOS logic levels from the code generator to the higher power levels sufficient to drive at least 10 lamps, one in each of possibly 10 separate cameras.

A logic control circuit 36, having a variable rate clock input 38, controls the timing of the parallel to serial converter 24 of the input circuit, the pulse width generator 28, and the blanking circuit 34 so that the output of the code generator is sufficiently faster than the film speed so as to record a complete code sequence at least once per frame between the sprocket holes. The variable rate clock 38 may include an electronically or manually adjustable potentiometer which is calibrated to correspond to the frame rate of a camera so as to provide a signal proportional to that rate.

A lamp power source 40 is provided for the lamp driver 30 and a separate and distinct logic power source 42 is provided for the remainder of the logic or control circuitry. If low voltage light sources are available in the camera, a single power source could be used. The power sources 40 and 42 are regulated power supplied derived from the 110 volt AC line used by the cameras.

From the preceding description of the preferred embodiments, it is obvious that the objects of the invention are obtained. A code is provided and an apparatus for generating a code such that a variable width bar code is produced at a rate sufficiently faster than the film rate of a motion picture camera so as to be able to record at least 12 bits of data adjacent each frame on the film. Although the invention has been described and illustrated in detail, it is to be clearly understood that the same is by way of illustration and example only.

I wish it to be understood that I do not desire to be limited to the exact details of construction shown and described, for obvious modifications can be made by a person skilled in the art.

What is claimed is:

1. In the combination of a movie camera having a light source for recording information by a single light beam on a film edge and a code generator for driving said light source, the improvement being in said code generator which comprises:
    input means for producing a serial binary code signal of N bits, where N is greater than six;
    a pulse width means for generating a variable pulse width representing a logic zero or a logic one in response to said code signal;
    output means for driving said light source; and
    control means connected to said input and pulse width means for causing the signal to be transferred from said input means to said output means through said pulse width means at a rate sufficiently greater than the speed of said film to record all N bits on the edge of a sngle frame of said film in a serial sequence.

2. The combination of claim 1, wherein said binary code signal is a binary coded decimal and N is twelve bits.

3. The combination of claim 1 wherein said input means includes means for converting a parallel binary coded decimal input to a series binary coded decimal signal.

4. The combination of claim 1 wherein said control means includes an adjustment to vary said output means relative to the film speed and a blanking means for producing a space between sequences.

5. The combination of claim 1 wherein said code generator includes a first power supply for said input, pulse width and control means and a second power supply for said output means.

6. A method of recording information on the edge of a movie strip film in a movie camera adjacent each frame by means of a single light beam comprising the steps of:

producing a serial binary coded signal representing said information;

generating a variable width pulse, a first width representing a logic zero and a second width representing a logic one in response to said coded signal;

transferring the variable pulse width coded signal to an output means at a rate sufficiently greater than the speed of said film so as to record the complete binary coded signal on the single frame of said film; and driving a light source from said output means so that the information is recorded in a serial sequence on the edge of each frame of said film.

7. The method of claim 6 wherein sad transferring step also comprises the step of blanking a portion of said output so as to put a space between each sequence of coded information.

8. The method of claim 7 wherein the step of producing a serial binary code comprises converting a parallel binary coded decimal input to said serial binary coded decimal signal.

9. The method of claim 8 wherein the step of transferring the variable pulse signal also comprises adjusting a variable rate clock input which helps control the timing of said output signal in relation to said film speed.

10. The method of claim 9 wherein the complete code sequence is repeated 1½ to 2 times per frame.

* * * * *